(12) United States Patent
Blystad et al.

(10) Patent No.: US 8,400,010 B2
(45) Date of Patent: Mar. 19, 2013

(54) ELECTRICAL SWITCHGEAR, PARTICULARLY FOR CONNECTING GENERATORS AND THRUSTERS IN DYNAMICALLY POSITIONED VESSELS

(75) Inventors: Svein Blystad, Sandefjord (NO); Rune Van Ravens, Hagan (NO)

(73) Assignee: Siemens Aktiengesellschaft, Munich (DE)

( * ) Notice: Subject to any disclaimer, the term of this patent is extended or adjusted under 35 U.S.C. 154(b) by 332 days.

(21) Appl. No.: 12/738,403

(22) PCT Filed: Oct. 22, 2007

(86) PCT No.: PCT/EP2007/009149
§ 371 (c)(1),
(2), (4) Date: Jun. 29, 2010

(87) PCT Pub. No.: WO2009/052843
PCT Pub. Date: Apr. 30, 2009

(65) Prior Publication Data
US 2010/0271759 A1    Oct. 28, 2010

(51) Int. Cl.
*B60L 1/00* (2006.01)
(52) U.S. Cl. .......................................... 307/9.1
(58) Field of Classification Search .............. 307/65, 307/9.1
See application file for complete search history.

(56) References Cited

U.S. PATENT DOCUMENTS

| | | | |
|---|---|---|---|
| 2004/0201282 A1 | 10/2004 | Kado et al. | 307/64 |
| 2006/0056124 A1 | 3/2006 | Michalko | 361/62 |
| 2008/0034256 A1* | 2/2008 | Mosman | 714/43 |
| 2008/0182466 A1* | 7/2008 | Wegner-Donnelly et al. | 440/84 |

OTHER PUBLICATIONS

Watanabe et al. "A Genetic Algorithm for Optimizing Switching Sequence of Service Restoration in Distribution Systems", Evolutionary Computation, 2004. CEC2004. Congress on Portland, XP010719528, pp. 1683-1690 (8 pages).
International Search Report and Written Opinion for Application No. PCT/EP2007/009149 (13 pages), May 27, 2008.

* cited by examiner

*Primary Examiner* — Robert L. Deberadinis
(74) *Attorney, Agent, or Firm* — King & Spalding L.L.P.

(57) ABSTRACT

An electrical switchgear (1) for feeding at least two electrical consumers (3.1 to 3.*n*) with electrical energy from at least two energy sources (2.1 to 2.*n*), has at least one section (6.1 to 6.*n*) with two busbars (7.1 to 7.*n*) and a number of switches (8.1 to 8.*n*), wherein each busbar (7.1 to 7.*n*) is connectable to at least one of the energy sources (2.1 to 2.*n*) via one of the switches (8.1 to 8.*n*) for each energy source (2.1 to 2.*n*), respectively and wherein each busbar (7.1 to 7.*n*) is connectable to each one of the electrical consumers (3.1 to 3.*n*) via one of the switches (8.1 to 8.*n*) for each electrical consumer (3.1 to 3.*n*), respectively.

19 Claims, 3 Drawing Sheets

ELECTRICAL SWITCHGEAR, PARTICULARLY FOR CONNECTING GENERATORS AND THRUSTERS IN DYNAMICALLY POSITIONED VESSELS

CROSS-REFERENCE TO RELATED APPLICATIONS

This application is a U.S. National Stage Application of International Application No. PCT/EP2007/009149 filed Oct. 22, 2007, the contents of which are hereby incorporated by reference in their entirety.

TECHNICAL FIELD

The invention refers to an electrical switchgear, particularly for redundantly connecting generators and thrusters in dynamically positioned vessels. Furthermore the invention refers to a method for redundantly connecting generators and thrusters in dynamically positioned vessels using such an electrical switchgear.

BACKGROUND

Vessels for special tasks such as offshore oil drilling, well intervention and oil production can be required to operate in a so called "dynamically positioned" mode. In this mode they have to maintain their position by means of a multitude of thrusters or propellers against currents, wind and tide. Normally these thrusters are powered by electrical engines. The electrical energy needed is provided by diesel generators. Diesel generators and thrusters are connected by a switchgear comprising a system of busbars. Classification rules require such dynamically positioned vessels to have a high redundancy, so that failure of a generator, thruster or busbar can be compensated and the vessel maintains its position, however. In the worst case of a faulty busbar all generators, thrusters and other consumers attached to that busbar drop out and their tasks have to be taken by other generators, thrusters and consumers. Redundancy is traditionally achieved by e.g. installation of multiple busbar sections with connected thrusters and generators. The common design allows for loosing more than one thruster or generator in case of a busbar failure. Consequently, all thrusters and generators need to be sufficiently overrated in order to compensate the loss of the units attached to the faulty busbar. The overrating causes higher capital and operational expenditure as well as unnecessary pollution.

SUMMARY

According to various embodiments, an improved electrical switch gear can be provided for feeding at least two electrical consumers with electrical energy from at least two energy sources. According to other embodiments, a method for operating such an electrical switchgear can be provided.

According to an embodiment, an electrical switchgear for feeding at least two electrical consumers with electrical energy from at least two energy sources, may comprise at least one section with two busbars and a number of switches, wherein each busbar is connectable to at least one of the energy sources via one of the switches for each energy source, respectively and wherein each busbar is connectable to each one of the electrical consumers via one of the switches for each electrical consumer, respectively.

1. According to a further embodiment, the energy source can be a generator powered by a combustion engine. According to a further embodiment, the electrical consumer may comprise a thruster. According to a further embodiment, the busbars may be interconnectable by at least one of the switches. According to a further embodiment, each busbar of one of the sections may be connectable to at least one of the busbars of at least another, adjacent one of the sections by one of the switches, respectively. According to a further embodiment, the electrical consumer may comprise a main transformer for feeding a converted voltage to the thruster. According to a further embodiment, the electrical consumer may comprise at least one auxiliary device for starting and/or operating the thruster, wherein the thruster and the auxiliary device share the same connection to the busbar via one of the switches. According to a further embodiment, the electrical consumer may comprise an auxiliary transformer for feeding a converted voltage to the auxiliary device. According to a further embodiment, the auxiliary transformer may be integrated with the main transformer. According to a further embodiment, the main transformer may exhibit four windings, one of them serving as the auxiliary transformer. According to a further embodiment, the electrical consumer may be connectable to one of the busbars by one of the switches designed as a normally closed contact and that the electrical consumer is connectable to the other one of the busbars of the same segment by another one of the switches designed as a normally open contact. According to a further embodiment, the energy source may be connectable to one of the busbars by one of the switches designed as a normally closed contact. According to a further embodiment, the energy source may be connectable to the other one of the busbars of the same segment by another one of the switches designed as a normally open contact. According to a further embodiment, the busbars of one of the segments may be interconnectable by one of the switches designed as a normally open contact. According to a further embodiment, each busbar of one of the sections may be connectable to at least one of the busbars of at least another, adjacent one of the sections by one of the switches, respectively, the switch being designed as a normally open contact. According to a further embodiment, the switch can be a relay. According to a further embodiment, the switch can be a semiconductor component.

According to a further embodiment, a method for operating an electrical switchgear may comprise: at least one faulty one of the busbars is identified in at least one of the segments and the electrical consumer and/or the energy source connected to the faulty busbar by one of the switches, respectively are/is disconnected from the faulty busbar and reconnected to the other busbar of the same segment by another one of the switches, respectively.

According to yet another embodiment, a dynamically positioned vessel may comprise at least two energy sources designed as diesel generators and at least two electrical consumers, at least one of the electrical consumers comprising a thruster, the energy sources and electrical consumers being connected to an electrical switchgear as described above.

BRIEF DESCRIPTION OF THE DRAWINGS

The invention will now be described in more detail with reference to the accompanying drawings, in which.

DETAILED DESCRIPTION

Figure 1:
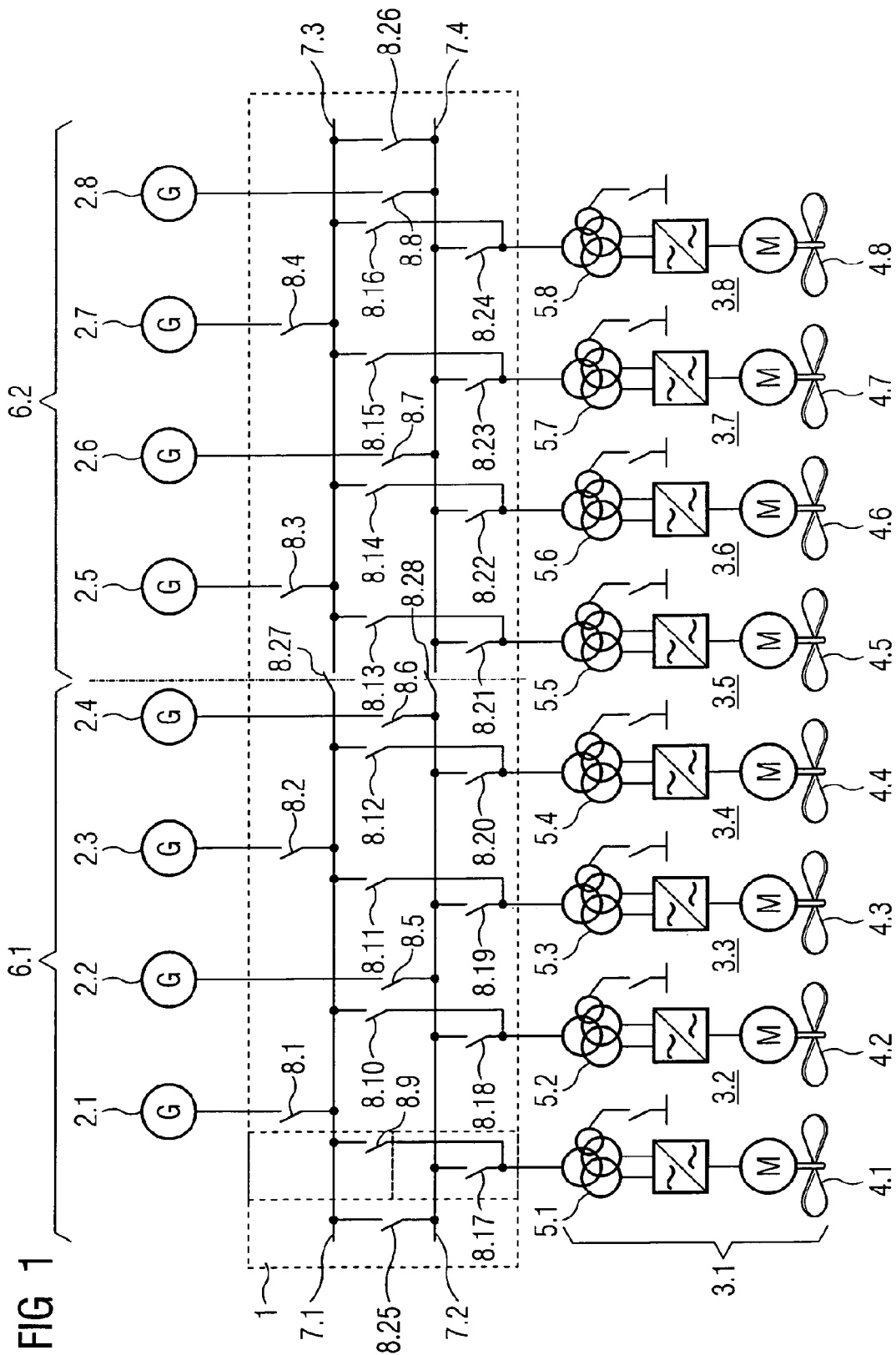
FIG. 1 is a schematic of an electrical switchgear connecting energy sources and electrical consumers.

An electrical switchgear according to various embodiments serves for feeding at least two electrical consumers with electrical energy from at least two energy sources. In particular the electrical consumers comprise thrusters for driving and/or steering a vessel in dynamically positioned mode. The energy sources are preferably designed as generators powered by a combustion engine, such as diesel generators. The electrical switchgear comprises at least one section with two busbars and a number of switches. Each busbar of the section is connectable to at least one of the energy sources via one of the switches for each energy source, respectively. Each busbar is also connectable to each one of the electrical consumers via one of the switches for each electrical consumer, respectively. When a faulty busbar is identified in at least one of the segments, the electrical consumer and/or the energy source connected to the faulty busbar by one of the switches, respectively may be disconnected from the faulty busbar and reconnected to the other busbar of the segment by another one of the switches, respectively. This can be achieved by appropriately operating the switches. In case the energy sources are respectively connected to only one of the busbars, one of the energy sources has to take the full load in this case. Thus each energy source is preferably connectable to both busbars so it can be disconnected from a faulty busbar and reconnected to the healthy one as well as the electrical consumers. Thus a lower degree of overrating thrusters and generators is needed so additional weight, space requirements are avoided and costs are kept lower. The diesel engines can be designed with lower rating, allowing for running them at nearly optimal load, thus reducing operational costs and pollution. Any electrical consumer and/or energy source can be allocated to two busbars thus giving more flexibility in order to limit consequences of a failure or planned disconnection, e.g. in case of maintenance.

In an embodiment the busbars are interconnectable by at least one of the switches. This allows for reconnecting healthy parts of the faulty busbar to the other busbar thus avoiding high current load in the healthy busbar increasing the risk of failure.

In another embodiment at least two sections are arranged. Each busbar of one of the sections is connectable to at least one of the busbars of at least another, adjacent one of the sections by one of the switches, respectively. Thus healthy parts of a partially faulty busbar in one of the sections can be fed energy from one of the busbars of the adjacent section.

The electrical consumer preferably comprises a main transformer for feeding a converted voltage to the thruster, in particular via a frequency converter. Thus a voltage provided by the energy sources is converted to a voltage needed by the thrusters or other electrical consumers.

The electrical consumer may comprise at least one auxiliary device required by the thruster, such as hydraulic pumps, lube oil pumps etc. The thruster and the auxiliary device share the same connection to the busbar via one of the switches. Thus the thruster becomes autonomous, i.e. independent from any other thruster or power source.

The auxiliary devices may need to be powered with a lower voltage than the thruster. In this case the auxiliary device is fed from an auxiliary transformer.

The auxiliary transformer is preferably arranged near the main transformer. This way the effort for cabling is reduced thus also reducing requirements for material, time, space and weight and consequently costs. In yet another embodiment the auxiliary transformer is integrated with the main transformer, thus further reducing costs and space.

The integration can be achieved in the form of a main transformer with four windings, one of them serving as the auxiliary transformer, the other ones for feeding energy in from the busbars and out to the thruster.

Preferably the electrical consumer is connectable to one of the busbars by one of the switches designed as a normally closed contact. At the same time the electrical consumer is connectable to the other one of the busbars by another one of the switches designed as a normally open contact. Thus without any control of the switches a situation is achieved in which the electrical consumer, e.g. the thruster is connected to one of the busbars and disconnected from the other one by default.

In yet another embodiment, the energy source is connectable to one of the busbars by one of the switches designed as a normally closed contact. Thus a default connection is defined with a passive switch control.

Preferably the energy source is connectable to the other one of the busbars by another one of the switches designed as a normally open contact. Thus the energy source is disconnected from the other busbar by default.

The switch the busbars of one segment can be interconnected with is preferably designed as a normally open contact. Thus a connection between the busbars is established only when the switch is activated in case of an identified failure of a busbar. By default the busbars are disconnected.

The switch for connecting one of the busbars of one of the sections to one of the busbars of another, adjacent ones of the sections is preferably designed as a normally open contact. Thus a connection between the adjacent busbars is established only when the switch is activated in case of an identified failure of a busbar in one of the sections. By default the busbars are disconnected.

The switch can be designed as a circuit breaker or as a semiconductor component. Circuit breakers provide a default position and have thus the advantage of maintaining a default switching status when the switch control is out of order. Semiconductors are usually faster than circuit breakers and do not wear as fast.

The switchgear is preferably applied in a dynamically positioned vessel for connecting at least two energy sources designed as diesel generators and at least two electrical consumers, wherein at least one of the electrical consumers comprises a thruster. Thus the vessel can maintain its position even in case one or more of the busbars, energy sources or electrical consumers fails without the need of huge overratings of energy sources and thrusters.

FIG. 1 shows a schematic of a first embodiment of an electrical switchgear 1 connecting a number of energy sources 2.1 to 2.8 to a number of electrical consumers 3.1 to 3.8. The energy sources 2.1 to 2.8 are designed as diesel generators powered by diesel fuel or diesel oil. Each one of the electrical consumers 3.1 to 3.8 comprises a thruster 4.1 to 4.8 for dynamically positioning a vessel (not shown), e.g. a vessel for special tasks such as oil drilling. Each electrical consumer 3.1 to 3.8 comprises a main transformer 5.1 to 5.8 for adapting a voltage supplied by the energy sources 2.1 to 2.8 to the needs of the thrusters 4.1 to 4.8. The main transformers 5.1 to 5.8 are equipped with four windings each, one of the windings serving as an auxiliary transformer for powering a respective auxiliary device (not shown) for starting and steering the respective thruster 4.1 to 4.8.

The electrical switchgear 1 comprises two sections 6.1, 6.2 with two busbars 7.1 to 7.4 in each section 6.1, 6.2. A number of switches 8.1 to 8.28 is arranged for connecting and disconnecting the energy sources 2.1 to 2.8 (switches 8.1 to 8.8) and the electrical consumers 3.1 to 3.8 (switches 8.9 to 8.24) to the busbars 7.1 to 7.4 as well as for interconnecting the pairs of busbars 7.1, 7.2 (switch 8.25) and 7.3, 7.4 (switch 8.26) within each section 6.1, 6.2. or for connecting the adjacent pairs of busbars 7.1, 7.3 (switch 8.27) and 7.2, 7.4 (switch 8.28) between the sections 6.1, 6.2, if required. Each electrical consumer 3.1 to 3.8 can thus be connected to both busbars 7.1 to 7.4 in the respective segment 6.1, 6.2.

For example, the electrical consumer 3.1 is connected to busbar 7.1 by the switch 8.9, which is normally closed. In case a failure is identified in busbar 7.1 leading to loss of power for the electrical consumer 3.1 the switch 8.9 is opened and thus the electrical consumer 3.1 is disconnected from the faulty busbar 7.1. The electrical consumer 3.1 is then reconnected to the healthy busbar 7.2 of the same segment 6.1 by the normally open contact switch 8.17 in order to regain a power supply.

Disconnection and reconnection works in a similar way for the other electrical consumers 3.2 to 3.8. All electrical consumers 3.1 to 3.8 are connectable to one of the busbars 7.1 to 7.4 by one normally closed contact switch 8.9, 8.11, ..., 8.23 and to the other one of the busbars 7.1 to 7.4 of the same segment 6.1, 6.2 by one normally open contact switch 8.10, 8.12, ..., 8.24. Each energy source 2.1 to 2.8 is connected to only one of the busbars 7.1 to 7.4 by a respective normally closed contact switch 8.1 to 8.8. In case one of the busbars 7.1 to 7.4 fails, the affected energy source 2.1 to 2.8 can be disconnected from the respective busbar 7.1 to 7.4.

Normally the respective electrical consumer 3.1 to 3.8 will be disconnected from the faulty busbar 7.1 to 7.4 at the same time, so the remaining energy sources 2.1 to 2.8 have to take the load of the disconnected one. When one of the busbars 7.1 to 7.4 is interrupted and only partly defective only the energy sources 2.1 to 2.8 and electrical consumers 3.1 to 3.8 affected by the faulty part have to be disconnected and/or reconnected, respectively. A healthy busbar 7.1 to 7.4 or part of it can also be connected to the other busbar 7.1 to 7.4 in the same segment 6.1, 6.2 by means of the normally open contact switch 8.25, 8.26 or to the respective adjacent busbar 7.1 to 7.4. in the other one of the segments 6.1, 6.2 by means of one of the normally open contact switches 8.27, 8.28.

Figure 2:
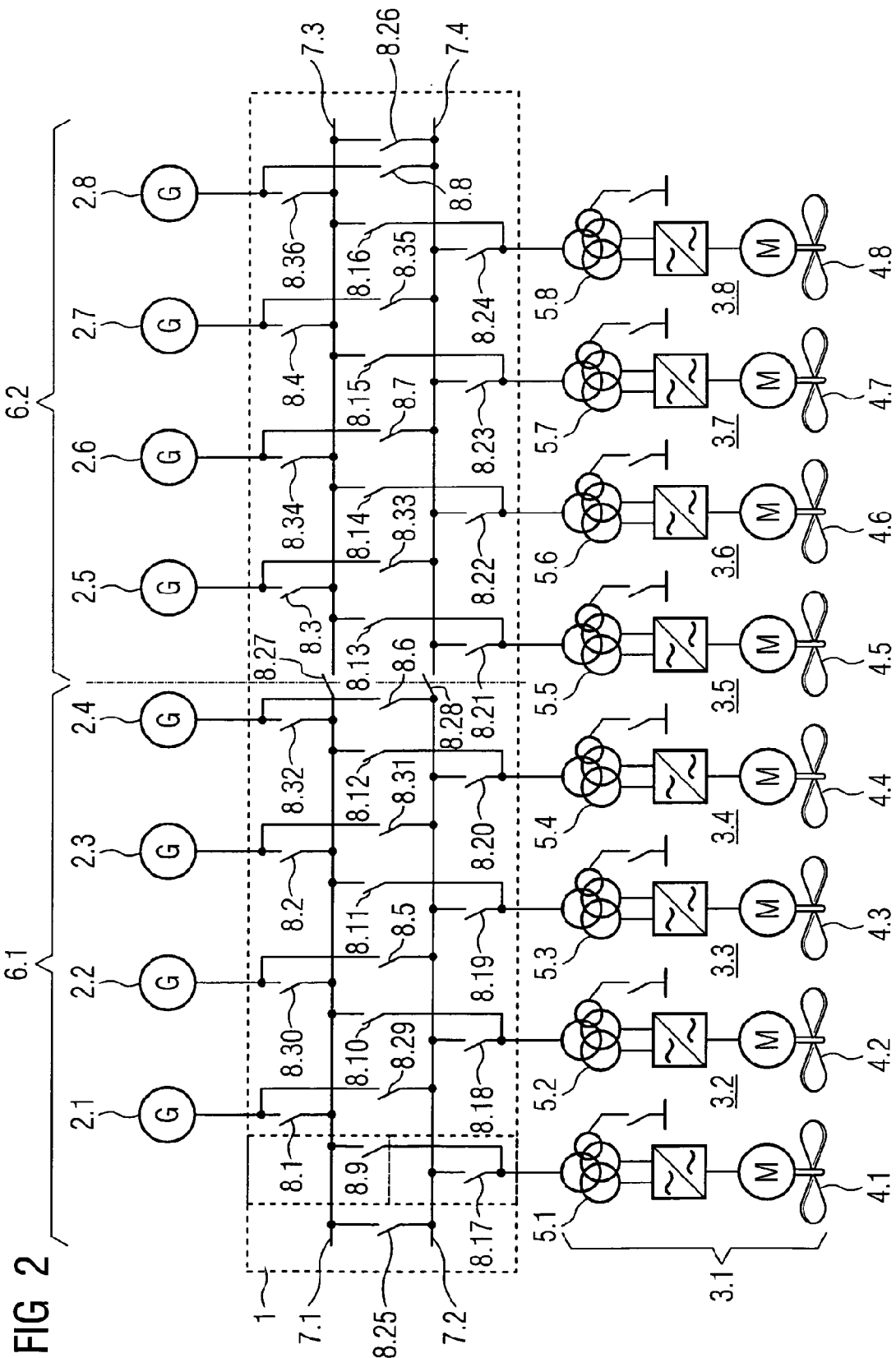
FIG. 2 is a schematic of another embodiment of an electrical switchgear connecting energy sources and electrical consumers.

FIG. 2 shows another embodiment of an electrical switchgear 1 connecting a number of energy sources 2.1 to 2.8 to a number of electrical consumers 3.1 to 3.8. The configuration is basically the same as in FIG. 1, except for the fact that all energy sources 2.1 to 2.8 can be connected to either one of the busbars 7.1 to 7.4 of the respective segment 6.1, 6.2. The additional switches 8.29 to 8.36 needed are designed as normally open contacts. In case of failure an energy source 2.1 to 2.8 normally connected to one of the busbars 7.1 to 7.4 can not only be disconnected from this busbar 7.1 to 7.4 but it can be reconnected to the respective other busbar 7.1 to 7.4 in the same segment 6.1, 6.2 thus still contributing to the overall power input.

Figure 3:
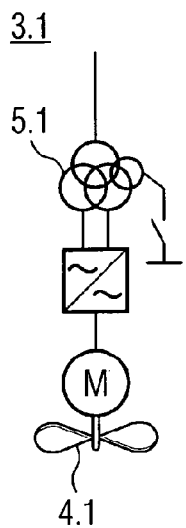
FIG. 3 is a schematic of one configuration of an electrical consumer comprising a main transformer, an auxiliary transformer provided by one of the windings of the main transformer, and a thruster.
Figure 4:
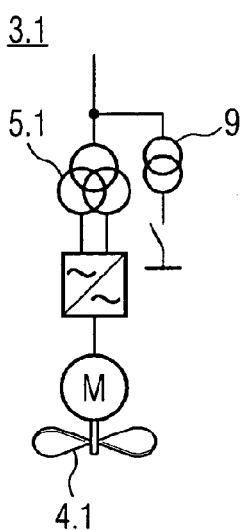
FIG. 4 is a schematic of an alternative configuration of an electrical consumer comprising a main transformer, an auxiliary transformer separate from the main transformer, and a thruster.

FIG. 3 shows two alternative configurations of an electrical consumer 3.1. In FIG. 3*a* the thruster 4.1 is supplied energy via the main transformer 5.1. The main transformer 5.1 is equipped with four windings, one of the windings serving as an auxiliary transformer for powering an auxiliary device (not shown) for starting and steering the thruster 4.1.

Another alternative is shown in FIG. 3*b*, wherein the auxiliary transformer 9 is a separate unit rather than integrated with the main transformer 5.1. However it is arranged near the main transformer 5.1.

The energy sources 2.1 to 2.*n* can alternatively be designed as generators powered by a fuel other than diesel fuel or diesel oil.

The number of energy sources 2.1 to 2.*n* and/or electrical consumers 3.1 to 3.*n* can be different from eight.

Electrical consumers 3.1 to 3.*n* containing other devices than thrusters 4.1 to 4.*n* can also be connected to the electrical switchgear 1. In particular in this case the electrical consumers 3.1 to 3.*n* do not necessarily have to comprise main transformers 5.1 to 5.*n* and/or auxiliary transformers.

The number of sections 6.1 to 6.*n* can alternatively be different from two. In particular only one section 6.1 can be arranged. In case the number of sections 6.1 to 6.*n* is greater than two all busbars 7.1 to 7.*n* of adjacent sections 6.1 to 6.*n* can be connected to one of the busbars 7.1 to 7.*n* of each adjacent section, respectively.

The number of energy sources 2.1 to 2.*n* and electrical consumers 3.1 to 3.*n* connected to a common busbar 7.1 to 7.*n* can be different from what has been shown in the figures.

The switches 8.1 to 8.*n* can be designed as relays or semiconductor components.

What is claimed is:

1. An electrical switchgear for feeding at least two electrical consumers with electrical energy from at least two energy sources, comprising:
    at least one section with two busbars and a number of switches,
    wherein each busbar is selectively connected to at least one of the energy sources via one of the switches for each energy source, respectively,
    wherein each busbar is selectively connected to each one of the electrical consumers via one of the switches for each electrical consumer, respectively, and
    wherein at least one of the electrical consumers comprises a thruster of a dynamically positioned vessel.

2. The electrical switchgear according to claim 1, wherein the energy source is a generator powered by a combustion engine.

3. The electrical switchgear according to claim 1, wherein the busbars are interconnectable by at least one of the switches.

4. The electrical switchgear according to claim 3, wherein the busbars of one of the segments are interconnectable by one of the switches designed as a normally open contact.

5. The electrical switchgear according to claim 1, wherein each busbar of one of the sections is connectable to at least one of the busbars of at least another, adjacent one of the sections by one of the switches, respectively.

6. The electrical switchgear according to claim 5, wherein each busbar of one of the sections is connectable to at least one of the busbars of at least another, adjacent one of the sections by one of the switches, respectively, the switch being designed as a normally open contact.

7. The electrical switchgear according to claim 1, wherein the electrical consumer comprises a main transformer for feeding a converted voltage to the thruster.

8. The electrical switchgear according to claim 1, wherein the electrical consumer comprises at least one auxiliary device for at least one of starting and operating the thruster, wherein the thruster and the auxiliary device share the same connection to the busbar via one of the switches.

9. The electrical switchgear according to claim 1, wherein the electrical consumer comprises an auxiliary transformer for feeding a converted voltage to the auxiliary device.

10. The electrical switchgear according to claim 9, wherein the auxiliary transformer is integrated with the main transformer.

11. The electrical switchgear according to claim 10, wherein the main transformer exhibits four windings, one of them serving as the auxiliary transformer.

12. The electrical switchgear according to claim 1, wherein the electrical consumer is connectable to one of the busbars by one of the switches designed as a normally closed contact and that the electrical consumer is connectable to the other one of the busbars of the same segment by another one of the switches designed as a normally open contact.

13. The electrical switchgear according to claim 1, wherein the energy source is connectable to one of the busbars by one of the switches designed as a normally closed contact.

14. The electrical switchgear according to claim 13, wherein the energy source is connectable to the other one of the busbars of the same segment by another one of the switches designed as a normally open contact.

15. The electrical switchgear according to claim 1, wherein the switch is a relay.

16. The electrical switchgear according to claim 1, wherein the switch is a semiconductor component.

17. A method for operating an electrical switchgear having at least one section with two busbars and a number of switches, wherein each busbar is selectively connected to at least one of the energy sources via one of the switches for each energy source, respectively and wherein each busbar is selectively connected to each one of the electrical consumers via one of the switches for each electrical consumer, respectively, the method comprising the steps of:
- identifying at least one faulty one of the busbars in at least one of the segments and
- disconnecting at least one of the electrical consumer and the energy source, which is connected to the faulty busbar, by one of the switches from the faulty busbar and
- reconnecting said at least one of the electrical consumer and the energy source to the other busbar of the same segment by another one of the switches, and
- wherein at least one of the electrical consumers comprises a thruster of a dynamically positioned vessel.

18. A dynamically positioned vessel comprising:
- at least two energy sources designed as diesel generators and at least two electrical consumers,
- at least one of the electrical consumers comprising a thruster, the energy sources and electrical consumers being connected to an electrical switchgear comprising at least one section with two busbars and a number of switches,
- wherein each busbar is selectively connected to at least one of the energy sources via one of the switches for each energy source, respectively, and
- wherein each busbar is selectively connected to each one of the electrical consumers via one of the switches for each electrical consumer, respectively, and
- wherein at least one of the electrical consumers comprises a thruster of a dynamically positioned vessel.

19. The dynamically positioned vessel according to claim 18, wherein each busbar of one of the sections is connectable to at least one of the busbars of at least another, adjacent one of the sections by one of the switches, respectively.

* * * * *